United States Patent

Lee

[11] Patent Number: 5,923,528
[45] Date of Patent: Jul. 13, 1999

[54] PITVOTAL APPARATUS FOR FLAT DISPLAY PANEL

[75] Inventor: Roger Lee, Taipei Hsien, Taiwan

[73] Assignee: Amtran Technology Co., Ltd., Taipei, Taiwan

[21] Appl. No.: 08/909,195

[22] Filed: Aug. 11, 1997

[30] Foreign Application Priority Data

May 7, 1997 [TW] Taiwan ................................. 86207358

[51] Int. Cl.⁶ .................................................... G06F 1/16
[52] U.S. Cl. .......................... 361/681; 248/922; 248/921; 248/291.1
[58] Field of Search .................... 361/681; 248/917–923, 248/291.1, 130; 364/708.1

[56] References Cited

U.S. PATENT DOCUMENTS

| D. 321,179 | 10/1991 | Oyama | D14/113 |
|---|---|---|---|
| D. 343,168 | 1/1994 | Morisaki et al. | D14/106 |
| 4,267,555 | 5/1981 | Boyd et al. | 345/126 |
| 4,542,377 | 9/1985 | Hagen et al. | 345/126 |
| 4,831,368 | 5/1989 | Masimo et al. | 345/126 |
| 5,134,390 | 7/1992 | Kishimoto et al. | 248/917 |
| 5,329,289 | 7/1994 | Sakamoto et al. | 248/922 |

*Primary Examiner*—Leo P. Picard
*Assistant Examiner*—Lisa Lea-Edmonds
*Attorney, Agent, or Firm*—Baker & McKenzie

[57] ABSTRACT

A pivotal apparatus for a flat display panel having a front housing and a rear housing connected to the front housing includes a support unit for supporting the flat display panel on a surface; and a rotary unit fixed to the support unit and rotatably connected to an outer surface of the rear housing of the flat display panel such that the flat display panel is rotatable in a clockwise and counterclockwise direction relative to the support unit.

13 Claims, 2 Drawing Sheets

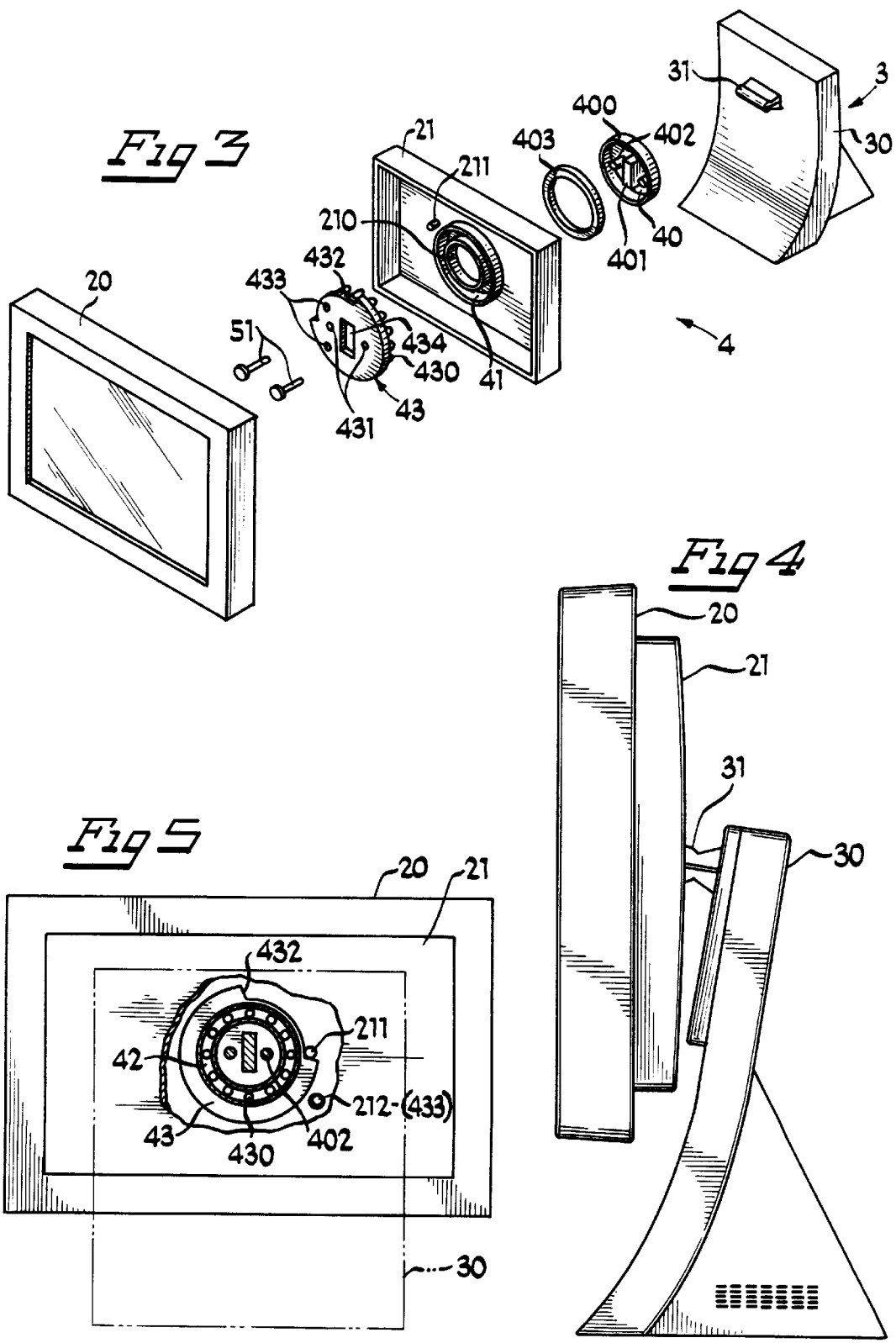

PITVOTAL APPARATUS FOR FLAT DISPLAY PANEL

BACKGROUND OF THE INVENTION

1. Field of the Invention

This invention relates to a pivotal apparatus for a flat display panel, more particularly to a pivotal apparatus which allows a flat display panel to rotate a predetermined angle in a clockwise or counterclockwise direction.

2. Description of the Related Art

As computers continue to rapidly develop, the requirements of computer monitors continue to increase. Presently, desktop computers generally use a monitor which is conventionally constructed from a cathode ray tube. However, due to the development of the flat display panel, there is a growing tendency toward using a flat display panel as the output device of a desktop computer as the flat display panel has many advantages.

FIG. 1 shows a conventional pivotal apparatus for a flat display panel. The flat display panel includes a front housing 10 and a rear housing 11 connected to the front housing 10. An elongated groove 110 is formed in a central portion of an outer surface of the rear housing 11. The groove 110 is defined by two opposed shorter side walls and two opposed longer side walls interconnecting the shorter side walls. A receiving hole 1100 is formed in each of the shorter side walls. The conventional pivotal apparatus includes a support arm 12 which has one end connectable to, for example, the edge of a table top 13. The support arm 12 has another end which is provided with a transversely extending pivotal head 120. An axially extending mounting pole 1200 projects outwardly from each end of the pivotal head 120. By way of a press-fit, the pivotal head 120 is inserted into the groove 110 of the rear housing 11, while the mounting poles 1200 are inserted into their respective receiving hole 1100. Therefore, the elevation angle of the flat display panel can be adjusted by rotating the flat display panel up and down relative to the table top 13.

However, in certain applications software for documentation, such as Windows 95 (particularly, the Chinese edition), the layout of a printed page on a computer display can be changed from characters reading from left to right and up to down, to characters reading from up to down and right to left. In some display modes, the characters displayed on the flat display panel are rotated 90 degrees such that it is difficult for the user to read the characters. However, heretofore, an apparatus for rotating a flat display panel 90 degrees in a clockwise or counterclockwise direction to accommodate different layouts of a printed page displayed on a flat display panel has been unavailable.

SUMMARY OF THE INVENTION

Therefore, it is one object of the present invention to provide a pivotal apparatus for a flat display panel that allows the flat display panel to rotate a predetermined angle in a clockwise or counterclockwise direction.

According to the present inventions a pivotal apparatus for a flat display panel which has a front housing and a rear housing connected to the front housing, includes a support unit for supporting the flat display panel on a surface; and a rotary unit fixed to the support unit and rotatably connected to an outer surface of the rear housing of the flat display panel such that the flat display panel is rotatable in a clockwise and counterclockwise direction relative to the support unit.

BRIEF DESCRIPTION OF THE DRAWINGS

Other features and advantages of the present invention will become apparent in the following detailed description of the preferred embodiment, with reference to the accompanying drawings, of which:

FIG. 3 is a schematic exploded view illustrating a pivotal apparatus for a flat display panel according to the present invention;

FIG. 4 is a schematic side view illustrating the pivotal apparatus for a flat display panel according to the present invention; and FIG. 5 is a schematic front view showing the pivotal apparatus for a flat display panel according to the present invention, with a front housing of the flat display panel being removed.

DETAILED DESCRIPTION OF THE PREFERRED EMBODIMENT

Figure 1:
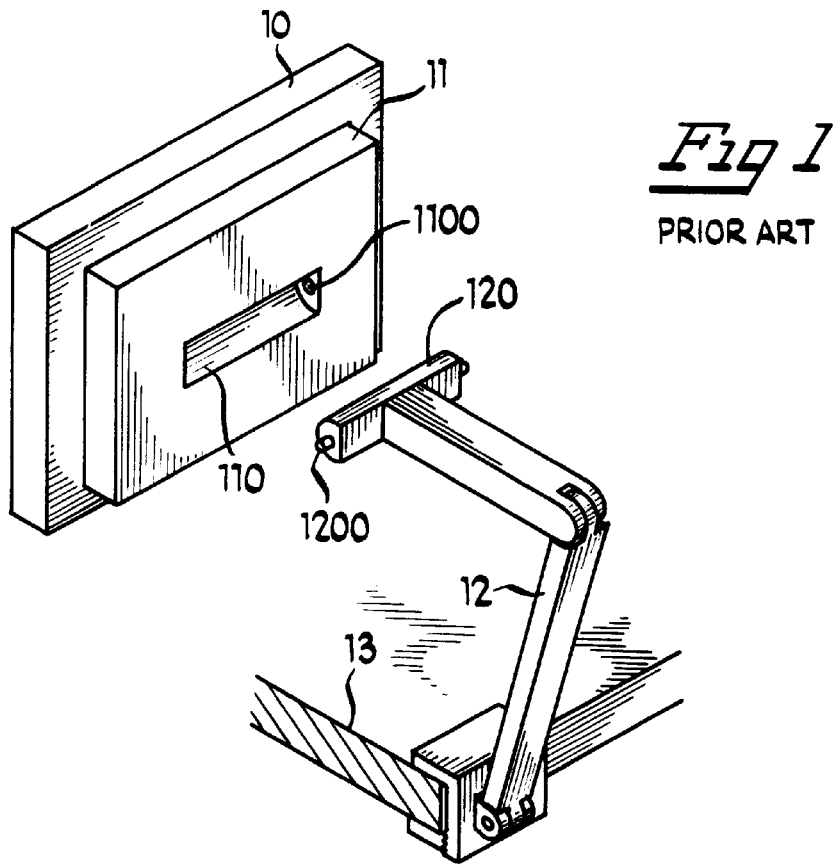
FIG. 1 is a schematic exploded view showing a conventional pivotal apparatus for a flat display panel.
Figure 2:
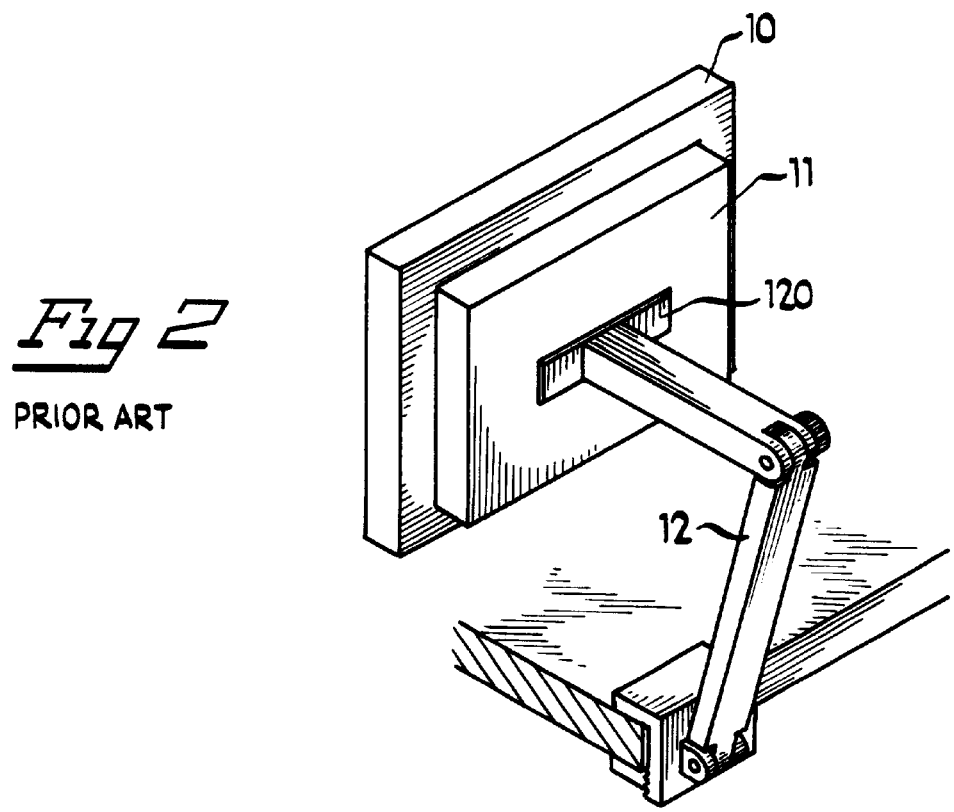
FIG. 2 is a schematic perspective view showing the conventional pivotal apparatus of FIG. 1.

Referring to FIGS. 3, 4 and 5, a pivotal apparatus for a flat display panel according to the present invention includes a support unit 3 and a rotary unit 4.

The flat display panel includes a front housing 20, a rear housing 21 connected to the front housing 20, and circuit means (not shown) installed between the front and rear housings 20 and 21. A through-hole 210 is formed in the central portion of an outer surface of the rear housing 21.

The support unit 3 includes a base member 30 and a forwardly extending connecting member 31 which is provided at the top portion of the base member 30. The base member 30 is designed such that it can be stably placed on, for example, a desktop.

The rotary unit 4 includes a first disk member 40, an annular groove 41 which is formed on the outer surface of the rear housing 21 and which surrounds the through-hole 210 of the rear housing 21, an annular guide groove 42 which is formed on an inner surface of the rear housing 21 and which surrounds the through-hole 210 of the rear housing 21, and a second disk member 43.

An outer surface of the first disk member 40 is fixed to the free end of the connecting member 31 of the support unit 3. Of course, the connecting member 31 and the first disk member 40 may be constructed in a manner similar to that of the prior art described above, such that the first disk member 40 can be pivotally connected to the connecting member 31. An annular flange 400 extends axially and inwardly from the peripheral edge of the first disk member 40, and an inwardly extending mounting member 401 is provided on the central portion of an inner surface of the first disk member 40. A locking post 402 is provided on each of two sides of the mounting member 401. An annular ring 403 is disposed in the annular groove 41 between the rear housing 21 and the flange 400. In the present embodiment, the annular ring 403 is formed from nylon such that the rear housing 21 is smoothly rotatable relative to the first disk member 40.

The second disk member 43 is located between the front and rear housings 20 and 21, and a plurality of angularly equidistant round protrusions 430 are provided on an outer surface of the second disk member 43. The protrusions 430 extends into the guide groove 42 so as to permit rotation of the second disk member 43 relative to the rear housing 21. In the present embodiment, the second disk member 43 has a cut-out portion 432 which extends along the peripheral edge of the second disk member 43 for an angular distance of approximately 90 degrees and which is defined by two end walls. A through-hole 434 is formed on the central portion of the second disk member 43 for the passage of the mounting member 401 of the first disk member 40. In the present embodiment, the through-hole 434 and the mounting member 401 are complementary to each other. A through-hole 431 is formed on each of the-two sides of the through-hole 434. The first and second disk members 40 and 43 are connected to each other by extending fasteners 51 through the respective through-hole 431 and the respective locking post 402, so that relative movement between the first and second disk member 40 and 43 is inhibited.

According to the present invention, in operation, the flat display panel is movable between a first position, wherein one of the end walls defining the cut-out portion 432 of the second disk member 43 is against a stopping post 211 on an inner surface of the rear housing 21, while a positioning hole 433 of the second disk member 43 engages a positioning projection 212 on the inner surface of the rear housing 21 so as to prevent undesired relative movement between the rear housing 21 and the second disk member 43, and a second position, wherein another one of the end walls defining the cut-out portion 432 of the second disk member 43 is against the stopping post 211 of the rear housing 21, while another positioning hole 433 of the second disk member 43 engages the positioning projection 212 of the rear housing 21 so as to prevent undesired relative movement between the rear housing 21 and the second disk member 43.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A pivotal apparatus for a flat display panel, the flat display panel having a front housing and a rear housing connected to the front housing, said pivotal apparatus comprising:
    a support unit for supporting the flat display panel on a surface; and
    a rotary unit fixed to said support unit and rotatably connected to an outer surface of the rear housing of the flat display panel such that the flat display panel is rotatable in a clockwise and counterclockwise direction relative to said support unit,
    wherein said support unit includes a base member and a forwardly extending connecting member which is provided at the top portion of the base member, said connecting member having a free end which is fixed to the rotary unit,
    wherein the outer surface of the rear housing has a central portion with a through-hole, and
    wherein said rotary unit includes
        an annular groove formed on the outer surface of the rear housing, the annular groove surrounding the through-hole of the rear housing,
        an annular guide groove formed on an inner surface of the rear housing, the annular guide groove surrounding the through-hole of the rear housing,
        a first disk member having an outer surface which is fixed to a free end of said connecting member of said support unit, an annular flange which extends axially and inwardly from a peripheral edge thereof, and an inner surface which has an inwardly extending mounting member provided on a central portion thereof, said flange of said first disk member disposed in said annular groove such that the rear housing is rotatable relative to said first disk member, and
        a second disk member located between the front and rear housings, said second disk member having a central portion which is formed with a through-hole, said through-hole of said second disk member being complementary to said mounting member so as to permit passage of said mounting member therethrough, said second disk member further having an outer surface formed with a plurality of angularly equidistant round protrusions, said protrusions extending into said guide groove such that the rear housing is rotatable relative to the second disk member.

2. A pivot apparatus as claimed in claim 1, wherein the rear housing has a stopping post and a positioning projection formed on an inner surface thereof, said second disk member having a cut-out portion which extends along a peripheral edge of the second disk member for an angular distance of approximately 90 degrees and which is defined by two end walls, and two angularly spaced positioning holes adjacent to its peripheral edge, whereby the flat display panel is movable between a first position, wherein one of said end walls defining said cut-out portion of said second disk member is against said stopping post, while one of said positioning holes of said second disk member engages said positioning projection so as to prevent undesired relative movement between the rear housing and said second disk member, and a second position, wherein another one of said end walls defining said cut-out portion of said second disk member is against said stopping post of the rear housing, while another one of said positioning holes of said second disk member engages said positioning projection of the rear housing so as to prevent undesired relative movement between the rear housing and said second disk member.

3. A pivotal apparatus for a flat display panel, the flat display panel having a front housing and a rear housing connected to the front housing, the pivotal apparatus comprising:
    a support unit for supporting the flat display panel on a surface, the support unit including a base member and a forwardly extending connecting member provided at a top portion of the base member;
    a first disk member having an outer surface and an inner surface, the outer surface of the first disk member being fixed to a free end of the connecting member of the support unit, the inner surface of the first disk member having a first bearing surface disposed in sliding contact with an outer surface of the rear housing of the flat display panel such that the rear housing is rotatable relative to the first disk member;
    a second disk member having an outer surface, the second disk member being located between the front and rear housings, the outer surface of the second disk member having a second bearing surface disposed in sliding contact with an inner surface of the rear housing of the flat display panel such that the rear housing is rotatable relative to the second disk member; and
    at least one fastener for connecting the first disk member and the second disk member, each fastener extending through a hole in a central portion of the rear housing.

4. The pivotal apparatus of claim 3 wherein:

the inner surface of the first disk member has an inwardly extending mounting member provided on a central portion thereof, and the second disk member has a central portion with a through-hole, the through-hole being complementary to the mounting member so as to permit passage of the mounting member therethrough.

5. The pivotal apparatus of claim 3 wherein:

the outer surface of the rear housing includes an annular groove which surrounds the hole in the central portion of the rear housing, and the first bearing surface of the first disk member comprises an annular flange which extends axially and inwardly from a peripheral edge of the first disk member, the annular flange being disposed in the annular groove such that the rear housing is rotatable relative to the first disk member.

6. The pivotal apparatus of claim 3 wherein:

the inner surface of the rear housing includes an annular guide groove which surrounds the hole in the central portion of the rear housing, and the second bearing surface of the second disk member comprises a plurality of round protrusions, the protrusions extending into the annular guide groove such that the rear housing is rotatable relative to the second disk member.

7. A pivotal apparatus of claim 3 wherein:

the rear housing includes a stopping post on its inner surface, and the second disk member has a cut-out portion which extends along a peripheral edge of the second disk member for an angular distance of approximately 90 degrees and which is defined by two end walls, whereby the flat display panel is movable between a first position, wherein one of the end walls defining the cut-out portion of the second disk member is against the stopping post, and a second position, wherein another one of the end walls defining the cut-out portion of the second disk member is against the stopping post.

8. The pivotal apparatus of claim 7 wherein:

the rear housing further includes a positioning projection on its inner surface, and the second disk member has two angularly spaced positioning holes adjacent to its peripheral edge, whereby one of the positioning holes of the second disk member engages the positioning projection so as to prevent undesired relative movement between the rear housing and the second disk member when the flat display panel is in the first position, and another one of the positioning holes of the second disk member engages the positioning projection so as to prevent undesired relative movement between the rear housing and the second disk member when the flat display panel is in the second position.

9. A pivotal apparatus for a flat display panel, the flat display panel having a front housing and a rear housing connected to the front housing, the pivotal apparatus comprising:

a support unit for supporting the flat display panel on a surface, the support u nit including a base member and a forwardly extending connecting member provided at a top portion of the base member;

a first disk member having an outer surface and an inner surface, the outer surface of the first disk member being fixed to a free end of the connecting member of the support unit, the inner surface of the first disk member having a first bearing surface disposed in sliding contact with an outer surface of the rear housing of the flat display panel such that the rear housing is rotatable relative to the first disk member;

a second disk member having an outer surface, the second disk member being located between the front and rear housings, the outer surface of the second disk member having a second bearing surface disposed in sliding contact with an inner surface of the rear housing of the flat display panel such that the rear housing is rotatable relative to the second disk member; and means for connecting the first disk member and the second disk member, the means for connecting the first disk member and the second disk member comprising an inwardly extending mounting member provided on a central portion of the inner surface of the first disk member, a through-hole in a central portion of the second disk member, the through-hole being complementary to the mounting member so as to permit passage of the mounting member therethrough, and at least one fastener, the mounting member and each fastener extending through a hole in a central portion of the rear housing.

10. The pivotal apparatus of claim 9 wherein:

the outer surface of the rear housing includes an annular groove which surrounds the hole in the central portion of the rear housing, and the first bearing surface of the first disk member comprises an annular flange which extends axially and inwardly from a peripheral edge of the first disk member, the annular flange being disposed in the annular groove such that the rear housing is rotatable relative to the first disk member.

11. The pivotal apparatus of claim 10 wherein:

the inner surface of the rear housing includes an annular guide groove which surrounds the hole in the central portion of the rear housing, and the second bearing surface of the second disk member comprises a plurality of round protrusions, the protrusions extending into the annular guide groove such that the rear housing is rotatable relative to the second disk member.

12. The pivotal apparatus of claim 11 wherein:

the rear housing includes a stopping post on its inner surface, and the second disk member has a cut-out portion which extends along a peripheral edge of the second disk member for an angular distance of approximately 90 degrees and which is defined by two end walls, whereby the flat display panel is movable between a first position, wherein one of the end walls defining the cut-out portion of the second disk member is against the stopping post, and a second position, wherein another one of the end walls defining the cut-out portion of the second disk member is against the stopping post.

13. The pivotal apparatus of claim 12 wherein:

the rear housing further includes a positioning projection on its inner surface, and the second disk member has two angularly spaced positioning holes adjacent to its peripheral edge, whereby one of the positioning holes of the second disk member engages the positioning projection so as to prevent undesired relative movement between the rear housing and the second disk member when the flat display panel is in the first position, and another one of the positioning holes of the second disk member engages the positioning projection so as to prevent undesired relative movement between the rear housing and the second disk member when the flat display panel is in the second position.

* * * * *